(12) United States Patent
Helander

(10) Patent No.: US 6,728,237 B2
(45) Date of Patent: Apr. 27, 2004

(54) ARRANGEMENT, A SYSTEM AND A METHOD RELATING TO A PACKET DATA COMMUNICATION

(75) Inventor: Lars-Erik Helander, Träslövsläge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 24 days.

(21) Appl. No.: 09/265,863

(22) Filed: Mar. 11, 1999

(65) Prior Publication Data

US 2003/0193920 A1 Oct. 16, 2003

(30) Foreign Application Priority Data

Mar. 13, 1998 (SE) ............................................... 9800813

(51) Int. Cl.[7] ............................................... H04L 12/66
(52) U.S. Cl. ....................... 370/352; 455/453; 455/435; 370/339
(58) Field of Search ............................... 370/338, 329, 370/229, 450, 468, 337, 341, 401, 437, 352, 236.1–237.1; 455/560, 453, 432, 445, 9, 435; 709/235; 379/133; 364/514, 551.01

(56) References Cited

U.S. PATENT DOCUMENTS

| | | | |
|---|---|---|---|
| 5,245,616 A | 9/1993 | Olson | 371/32 |
| 5,548,533 A * | 8/1996 | Gao et al. | 364/514 |
| 5,697,054 A * | 12/1997 | Andersson | 455/33.1 |
| 5,751,969 A | 5/1998 | Kapoor | 395/200.65 |
| 5,933,777 A | 8/1999 | Rahman | 455/450 |
| 6,014,567 A | 1/2000 | Budka | 455/453 |
| 6,064,892 A | 5/2000 | Miyagawa et al. | 455/560 |
| 6,078,817 A * | 6/2000 | Rahman | 455/452 |
| 6,111,867 A | 8/2000 | Mann et al. | 370/337 |
| 6,185,196 B1 | 2/2001 | Mademann | 370/327 |
| 6,314,525 B1 * | 11/2001 | Mahalingham et al. | 714/4 |

FOREIGN PATENT DOCUMENTS

| | | | |
|---|---|---|---|
| WO | 94/08406 | 4/1994 | ............ H04B/7/26 |
| WO | 95/16330 | 6/1995 | ............ H04Q/7/22 |
| WO | 96/07277 | 3/1996 | |
| WO | 97/15168 | 4/1997 | ............ H04Q/7/38 |
| WO | 97/21313 | 6/1997 | ............ H04Q/7/22 |
| WO | 97/26739 | 7/1997 | ........... H04L/12/56 |
| WO | 97/26764 | 7/1997 | ............ H04Q/7/22 |

OTHER PUBLICATIONS

Global System for Mobile Communications, Draft TS 100 960 V5.0.0., European Telecommunications Standards Institute, Jan., 1998.

Global System for Mobile Communications, GSM 03.60 V5.2.0., European Telecommunications Standards Institute, Dec., 1997.

Global System for Mobile Communications, TS 04.64 V5.1.0., European Telecommunications Standards Institute, Dec., 1997.

(List continued on next page.)

Primary Examiner—Edward F. Urban
Assistant Examiner—C. Chow

(57) ABSTRACT

In a cellular communication system, a processing arrangement and method supporting packet data communication. The processing arrangement includes a plurality of base station processors (BPs) and a plurality of managing processors (MPs). Each BP communicates with a plurality of base stations and mobile subscriber stations. The MPs manage the mobile subscriber stations, and each MP contains mobile subscriber station information for a number of mobile subscriber stations. The MPs provide information regarding their processing load status to the BPs by adding the information to packet data transmissions. The BPs use the information to assign each mobile subscriber station that is registered with the arrangement to one of the MPs.

21 Claims, 9 Drawing Sheets

OTHER PUBLICATIONS

Global System for Mobile Communications, TS GSM 08.18 V.5.0.0., European Telecommunications Standards Institute, Jan., 1998.

Global System for Mobile Communications, TS 04,65, V.5.1.0, European Telecommunications Standards Institute, Dec., 1997.

* cited by examiner

ARRANGEMENT, A SYSTEM AND A METHOD RELATING TO A PACKET DATA COMMUNICATION

TECHNICAL FIELD

The present invention relates to an arrangement in a cellular communication system supporting packet data communication, a cellular communication system supporting packet data communication and a method of controlling the load distribution in an arrangement or in a node in a communication system supporting packet data communication.

BACKGROUND

Cellular communication systems which, in addition to supporting communication of speech and circuit switched data, also support communication of packet data, are becoming more and more attractive. For example, for GSM (Global System for Mobile Communications) support for communication of packet data is developing through the general packet radio service (GPRS). Similarly the PDC system (Pacific Digital Communications) is provided with packet data communication support through the PPDC (Packet PDC). CDPD is another such packet data communication supporting service for the AMPS system.

The general packet radio service (GPRS) of GSM uses a packet mode technique for the transfer of data as well as signalling and GPRS radio channels are defined the allocation of which is flexible and time slots in a TDMA frame (Time Division Multiple Access) are shared by the users that are active and uplink and downlink are allocated separately. In GPRS, as well as in other packet data communication supporting cellular systems, nodes are introduced for management of the packet data communication. Such nodes are here called packet data nodes. In GPRS the packet data node is called the serving GPRS support node (SGSN) which is at the same hierarchical level as an ordinary MSC (Mobile Switching Center) and it keeps track of the locations of individual mobile subscriber stations, performs security functions and access control. The SGSN is connected to the base station system with Frame Relay. GPRS also comprises another node, the gateway GSN (GGSN) providing interworking with external packet switched networks and it is connected with SGSN via an IP-based GPRS backbone network. Generally the amount of data packets sent from a mobile station through the data network via the packet data node is much lower than the traffic from the data network, via the packet data node, towards a mobile subscriber station. One reason therefore is that the mobile subscriber station, which for example may be connected to a small personal computer (PC) it reads E-mails from a mail server etc. Thus the subscriber station here for example only sends a short packet whereas it receives a large amount of packets or long messages. If for example connecting to Internet, the mobile subscriber station may for example just send a short message requesting a file whereupon it receives a large file. The problem is that the demands as to bandwidth are very asymmetrical in the packet data node handling mobile subscriber stations for all of which the situation may be similar, i.e. the load on the uplink is low whereas the load on the downlink is high. A packet data node may thus need several processors and it is a problem to handle the distribution of the load on the processors.

Information about the load status in different processors therefore has to be maintained in the node in some way. However, when a message is sent from one processor to another, a certain amount of system resources are required (communication media bandwidth, CPU-power, and so on). A message containing such information is small, but the ratio of the resources needed for such messages and the resources used for the sum of the bytes in the message are high. This means that it is very expensive, from an information density point of view, to send messages and the overhead caused by such a kind of information distribution would be high.

SUMMARY

What is needed is therefore a processing arrangement to be used in a packet data node particularly having asymmetrical requirements as to bandwidth for packets sent in one direction in relation to the amount of packets sent in the other direction which assures a safe and reliable transmission of packets in both directions without overload situations occurring or causing any delays or even worse, giving rise to loss of packets. Furthermore a cellular communication system supporting packet data communication is needed through which the above mentioned objects can be achieved. Still further, a method of controlling the load distribution in a packet data node in a cellular communication system supporting packet data communication is needed.

Therefore an arrangement is provided which comprises a processing arrangement at least comprising a number of first processing means and a number of second processing means. The first processing means communicate with a number of base stations and terminate a first communication protocol. The second processing means are given another functionality, namely that of managing the mobile subscriber stations which communicate with any of the base stations and terminating a second communication protocol for communication between the mobile subscriber stations and the packet data node in which the processing arrangement is provided. Each second processing means contains mobile subscriber station information for a number of mobile subscriber stations which are registered with the packet data node, each mobile subscriber station registered with the packet data node being assigned a particular second processing means. The first processing means are provided with information on the load on each second processing means and said first processing means use said information to assign mobile subscriber stations not actually registered with the arrangement to one of the second processing means. Information about the load status in the second processing means is provided to first processing means using the payload traffic sent from or via the data network to the mobile subscriber stations via the first processing means, at least if the load status in a second processing means exceeds a given value. In a particular embodiment separate load status information messages are created and sent from a second processing means to a first processing means if the packet communication load is low. In a exemplary embodiment information about the load status in a second processing means is included in each packet data message sent from a second processing means to a first processing means. In addition thereto, or as an alternative, load status information is provided with at least a given frequency to the first processing means and if no data packets are sent, a separate load status information message is sent so as to meet the requirements on the load status information transmission frequency. Alternatively, if the traffic is high, not every packet or message sent from a second processing means to a first processing means is provided with information about the load status of the particular second processing means but only with the given frequency.

At least of number of the second processing means may be provided with a timer, upon expiry of which a separate load status information message about the current load in the concerned second processing means is created and sent to the concerned first processing means. Alternatively, or additionally, the timer may be used to control the provision of load status information to the first processing means when load status information is added to the conventional traffic data packets sent.

In an advantageous embodiment each second processing means comprises a second message transportation system, second packet data handling means and load status information indicating means which are provided for keeping updated load status information about the local load status in the second processing means. First and second processing means communicate with each other using an interprocessor communication protocol. Examples thereon are ATM (Asynchronous Transfer Mode), Ethernet, FDDI (which is a token ring architecture). Other alternatives are however also possible.

In an exemplary embodiment load status information is added to a packet received in the message transportation system from the packet handling means of the second processing means to form a message comprising the packet data and the load status information, which message is provided to the relevant first processing means. The relevant first processing means is known since all mobile subscriber stations registered with the packet data node are assigned a particular second processing means keeping subscriber data information and thus the location is known.

In an alternative embodiment load status information is connected to a packet intended for a mobile subscriber station when there is a change in the load status in the second processing means. In a particular embodiment a limit is given and if the change in load status exceeds given limit, a message is connected to the payload traffic, i.e. a data packet. In a particular embodiment the second processing means includes means for communication with an external data network via third processing means terminating a third communication protocol. Alternatively the second processing means communicate with third processing means terminating a third protocol for communication with an external data network.

Particularly each first processing means comprises a first message transportation system and first packet handling means. In addition thereto each first processing means contains load status information holding means for holding information about the load status in all second processing means. Particularly the first load status information holding means contains one load status indicator for each second processing means and said load status indicators are updated with the current load status information when information is provided from a second processing means and said information is used for assigning a "new" mobile subscriber station to one of the second processing means. In a particular embodiment a load status level is given for at least a number of the second processing means and the first processing means use the load status information contained in the load status information holding means to control the assignment of new mobile subscriber stations considering said load status levels, i.e. the assignment of new mobile subscriber stations is performed in order not to exceed the load status levels of any of the second processing means. In an exemplary embodiment each first processing means is provided with information on the desired relation between the load on the different second processing means and the first processing means use the load status information to assign new mobile subscriber stations to the second processing means in order to maintain such relation between the load situation in the respective second processing means.

Advantageously the first message transportation system includes decomposing means for decomposing messages incoming from the second processing means and for providing the load status information to the load status information holding means and for sending the data packets to the first packet handling means. Particularly each second processing means includes composing means for composing packet data information and load status information into a message to be sent to a first processing means. At least a number of the second processing means, in an advantageous embodiment, include(s) a timer for controlling the transmission of local load status information with or without packet data information to at least a number of the first processing means. Particularly the message composing means creates and sends a message to the first processing means either when data packets is/are received from the data network and/or when the timer expires, said timer being resetted each time a local load status information is sent out to a first processing means.

In a particular embodiment the arrangement comprises a packet data node in a cellular communication system such as for example a serving GPRS support node in the GSM system or a P-MSC node in the PDC-system.

According to the invention a cellular communication system supporting packet data communication is also provided, which comprises a number of packet data nodes, each of which communicates with a number of base stations using a first communication protocol and with an external data network over a third communication protocol. Each packet data node comprises a processing arrangement managing the packet data communication through the node. The processing arrangement comprises a number of first processing means and a number of second processing means. Each first processing means communicates with a number of base stations and terminates a first communication protocol. Each second processing means contains mobile subscriber station information and each second processing means manages a number of mobile subscriber stations registered with, or assigned to, it.

Each first processing means is provided with information about the load status in all the second processing means and the first processing means use said load status information for assigning new mobile subscriber stations not assigned to any of the second processing means, to one of said second processing means. Particularly the information about the load status in the second processing means is added to data communication packets sent via the second processing means and having a mobile subscriber station as a destination, at least when the packet data communication in the packet data node is high.

In an exemplary embodiment each second processing means comprises a timer for controlling the transmission of load status information to the first processing means and, if no packets are sent from the second processing means, a load status information message is created and sent as a separate message containing information about the local load status in the second processing means, to a number of first processing means. In a particular embodiment information on the load status in a second processing means is sent upon expiry of a timer controlling the frequency for sending of load status information to the first processing means. Load status information may be also be sent when the load status in the second processing means changes or when the change in load status exceeds a given value. Advantageously each second processing means comprises a message transportation system and second packet data handling means. Load status indication means are provided and the second message transportation system comprises message composing means composing a message consisting of local load status information and packet data information when a packet arrives. Particularly the second message transportation system includes a timer and the message composing means sends a message including local load status information of the second processing means upon reception of a packet and/or upon expiry of the timer which is resetted each time a message including load status information is sent out.

Each first processing means comprises a first message transportation system, first packet handling means and load status information holding means for keeping information about the load status of all the second processing means. The first message transportation system comprises message decomposing means for decomposing a message received from a second processing means and for providing the load status information to the load status information holding means and for transmitting the packet data information to one of the base stations via the first packet handling means.

The invention also provides a method of controlling the load distribution in a packet data node in a communication system supporting packet data communication. The packet data node comprises a processing arrangement managing and controlling the sending of packet data to/from mobile subscriber stations communicating with the packet data node via base stations. The method comprises the steps of: communicating packet data to/from the mobile subscriber stations via first processing means, managing packet data communication and communicating with the mobile subscriber stations in a second processing means via a second communication protocol, adding load status information to packets destinated for mobile subscriber stations in said second processing means, sending the load status information to first processing means using an interprocessor communication protocol, keeping load status information on all second processing means in each first processing means, using the load status information in the first processing means to assign a new mobile subscriber station not registered with the packet data node to a second processing means so that the load is distributed among the second processing means.

Particularly the method includes the steps of adding local load status information about the load in second processing means each time the second processing means sends a data packet to a first processing means. Alternatively the method includes the steps of, in a second processing means, detecting if the load status in the second processing means has changed, or that the change has exceeded a given value, if yes, adding load status information to packet data sent to the/a first processing means.

The method may also include the steps of providing load status information from each or, a number of, second processing means at a given frequency. Load status information may then, in order to provide information with the given frequency, add load status information to a packet sent from the second processing means, or if no packet is sent, sending a separate message containing load status information only. Particularly the method includes the steps of, in each second processing means, creating and sending a message including load status information either when a packet is received in the second processing means over a third communication protocol communicating with a data network and/or when a timer expires, and, resetting the timer each time a message is sent out containing load status information, examining the message in a receiving first processing means, and, if the message contains load status information, storing the load status information into load status information handling means, and, sending packet data information, if contained in the message, to the appropriate base station.

BRIEF DESCRIPTION OF THE DRAWINGS

The invention will in the following be further described in a non-limiting way and with reference to the accompanying drawings, in which.

DETAILED DESCRIPTION

Figure 1A:
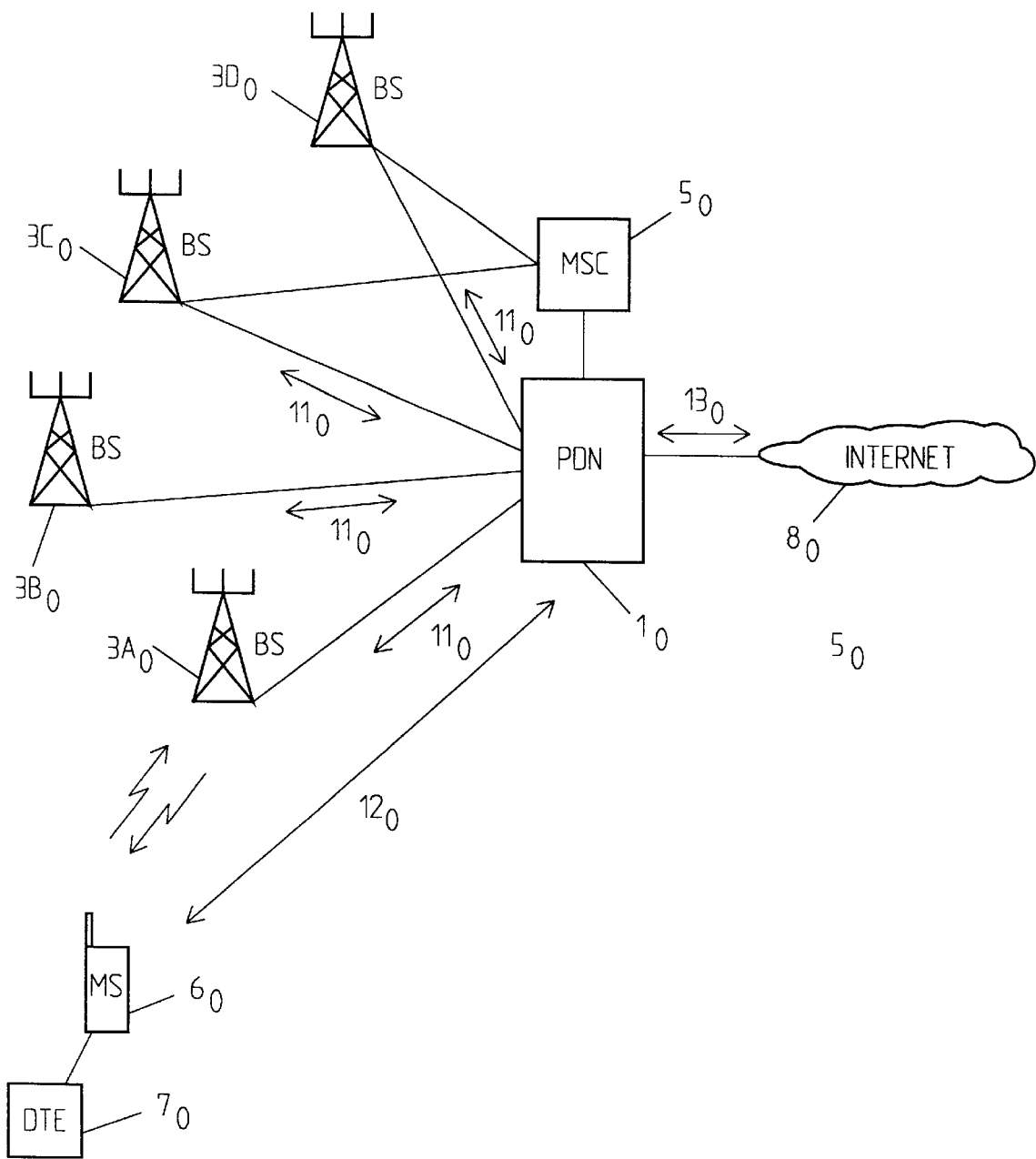
FIG. 1A is a simplified illustration of a communication system supporting packet data communication.

FIG. 1A shows an implementation of the invention in a mobile communication system supporting packet data communication. The communication system shows a number of base stations, in the following also denoted BS, $3A_0$, $3B_0$, $3C_0$, $3D_0$ communicating with a packet data node PDN $1_0$ over a first communication protocol $11_0$. Since the communication system also supports communication of speech and the circuit switched data it comprises a number of mobile switching centers MSC in a conventional manner and of which only one, MSC $5_0$ is illustrated. For reasons of clarity is also only illustrated that MSC $5_0$ communicates with BS:s $3C_0$, $3D_0$ In FIG. 1A a mobile station MS $6_0$ is illustrated which is connected to a digital terminal equipment DTE $7_0$. MS $6_0$ communicates via a radio link with BS $3A_0$. A second communication protocol $12_0$ is illustrated for communication between PDN $1_0$ and MS $6_0$. Information on mobile subscriber stations is kept in the packet data node $1_0$, which also provides for multiplexing, compression, access control etc. and the second communication protocol is virtual and "holds" packets together sent to/from the same destination. The packet data node $1_0$ also communicates with an external data network such as Internet (IN) $8_0$ via a third communication protocol $13_0$.

Figure 1B:
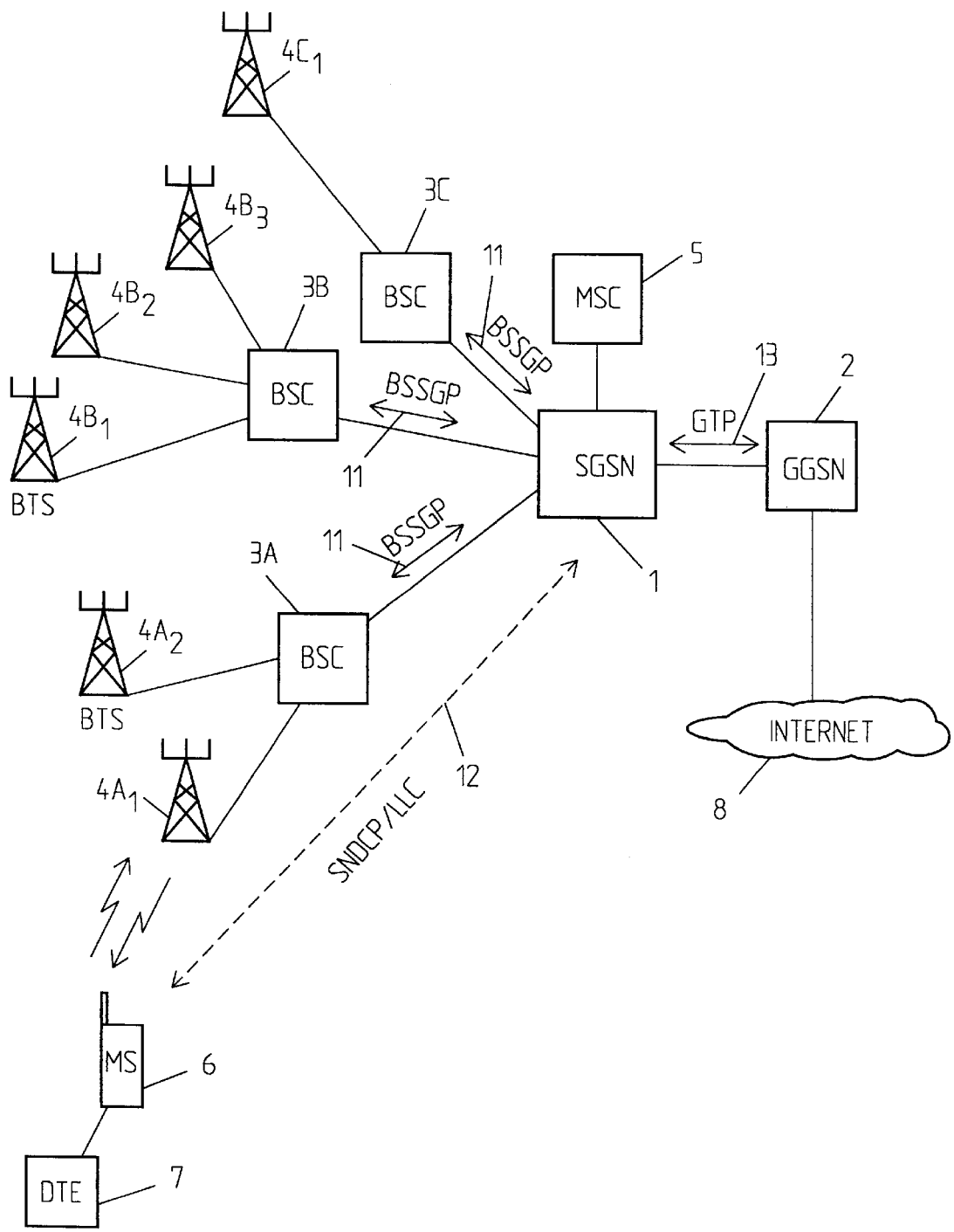
FIG. 1B is a figure similar to FIG. 1A, as implemented to GSM GPRS, FIG. 2 schematically illustrates a number of packet data nodes communicating with a number of base stations and an external data network, FIG. 3 schematically illustrates a packet data node including a processing arrangement according to the invention, FIG. 4 schematically illustrates a first processing means, FIG. 5 schematically illustrates a second processing means, FIG. 6 schematically illustrates sending information to a first processing means, FIG. 7 schematically illustrates communication between a mobile station and a packet data node.

FIG. 1B is a figure similar to that of FIG. 1A relating to the general packet radio service GPRS of the GSM system. The packet data node here comprises a serving GRPS support node SGSN communicating with a number of base station controllers BSC 3A, 3B, 3C each of which in turn communicates with a number of base transceiver stations BTS $4A_1$, $4A_2$; $4B_1$, $4B_2$, $4B_3$; $4C_1$. The SGSN 1 communicates with the BSCs 3A, 3B, 3C via the first communication protocol 11 which here is the base station system GPRS protocol BSSGP. The SGSN is at the same hierarchical level as a mobile switching center MSC, here is only one MSC 5 illustrated, and it keeps track of the locations of individual MSs, performs security functions and access control. The SGSN 1 is connected to the base station system with frame relay. The SGSN 1 is connected to a network node gateway GSN, GGSN 2 which provides interworking with external packet switched networks and it is connected with SGSNs via an IP (Internet Protocol)-based GPRS backbone network. The second communication protocols are here LLC (Logical Link Control) and SNDCP (Subnetwork Dependent Convergence Protocol) 12. The functionalities of SGSN and GGSN may be combined in one and the same physical node or they may reside in different physical nodes as illustrated in FIG. 1B. GTP, the GPRS tunnelling protocol 13 is a protocol between GSN nodes in the GPRS backbone network and it includes both GTP signalling and data transfer procedures. The GTP protocol is described in GSM 09.60, Version 5.0.0, Draft TS 100 960 V 5.0.0 (1998-01) by ETSI (European Telecommunication Standards Institutes) and it is herewith incorporated herein by reference. The general packet radio service GPRS is further described in GSM 03.60, Version 5.2.0 (1997-12), by ETSI and it is also incorporated herein by reference. GSM 04.65, Version 5.1.0, GSM 04.64, Version 5.1.0 and TS GSM 08.18 Version 5.0.0 by ETSI are likewise incorporated herein by reference and among others describe the SNDCP protocol, the logical link control (LLC) layer and the BSSGP.

Figure 2:
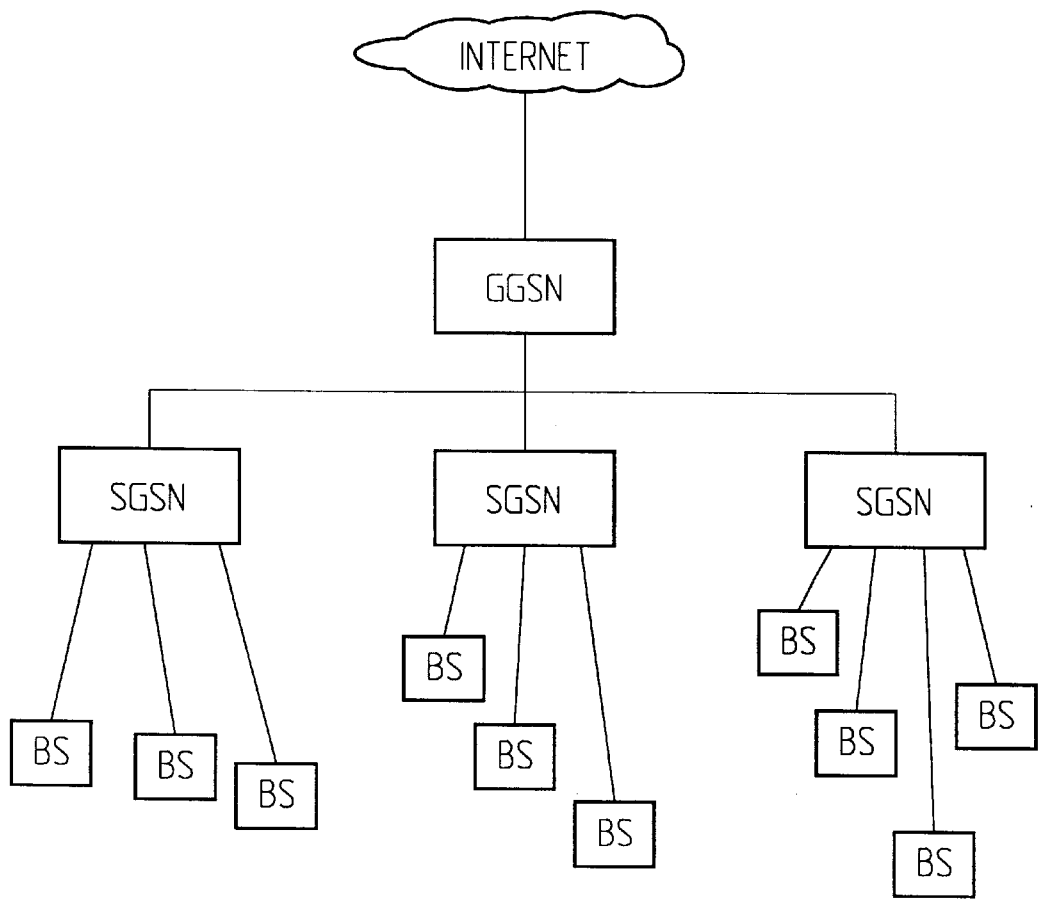

FIG. 2 in a very schematical way illustrates a number of SGSN:s communicating with a gateway GSN (GGSN) which forms a gateway to an external data network such as Internet IN. Each SGSN in turn communicates with a number of base stations, here simply referred to as BS:s. However, as referred to above, the GGSN functionality can also physically be included in the SGSN node. The concerned protocols are described with reference to FIG. 1B. For another communication system than GSM, the SGSN nodes correspond in more general terms to packet data nodes PDN and the gateway functionality can be separated from such PDNs or included in the PDNs in a similar manner.

Figure 3:
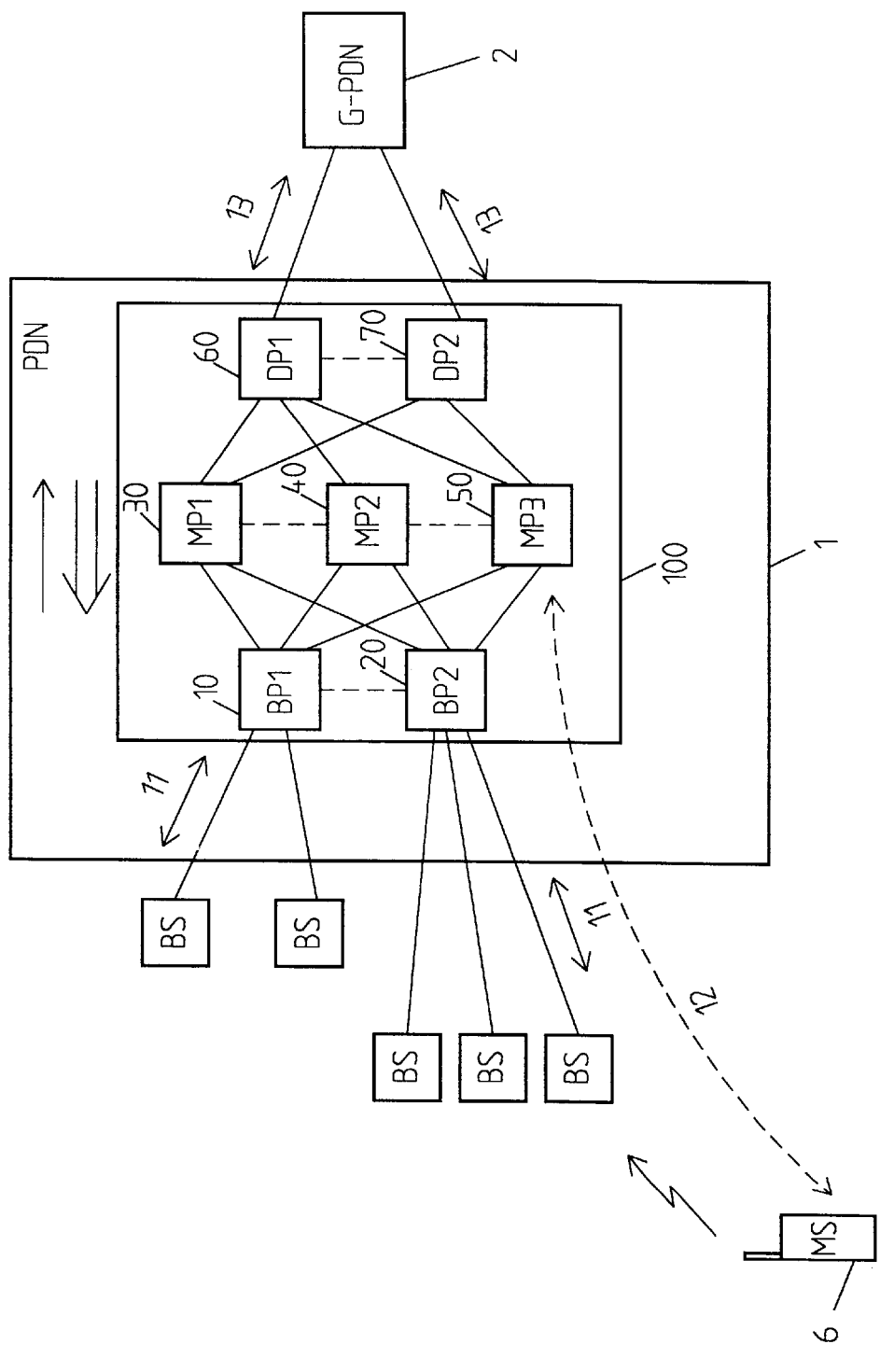

The invention will now be more thoroughly described with reference to FIG. 3 in which a packet data node 1, particularly SGSN of FIG. 1B, is illustrated. The same reference numbers as in FIG. 1B are used illustrating the implementation of the GSM system but it should be clear that the functioning is substantially the same for any cellular communication system supporting packet data communication. In this case the packet data node 1 communicates with gateway packet data node G-PDN 2 which thus forms a gateway to the external network or to other packet data nodes (not shown). PDN 1 here includes a processing arrangement 100 comprising a number of processing means 10, 20, 30, 40, 50, 60, 70. The different processing means of the processing arrangement 100 are given different functionalities. The processing means 10, 20 are here processors terminating the first communication protocol 11 between the PDN 1 and the base stations BS/BSC. Processing means BP1 10, BP2 20 thus each communicate with a number of base stations via the first communication protocol 11; in the case of GSM, the BSSGP protocol as referred to above. Although in the figure only two base station processing means BP1, BP2 are illustrated, it should be clear that more such processing means can be provided, for example between BP1 10 and BP2 20. A number of second processing means MP1 30, MP2 40, MP3 50 are also illustrated. It should be clear that also the number of second processing means can be different, for example there may be between 10 and 20 MP:s, but there can be fewer as well as more processors of any kind. The second processing means MP1, MP2, MP3 terminate the second communication protocol(s) 12, in the case of GSM, LLC and SNDCP respectively for communication between the mobile subscriber stations, of which here only one, namely MS6, is illustrated, and the packet data node PDN 1. In the implementation as illustrated in FIG. 3 also a third kind of processing means is included, namely DP1 60, DP2 70 terminating the third communication protocol for communication with an external data network, e.g. via a gateway PDN 2 (if such is provided which then terminates the third protocol on that side).

In the case of GSM, the third communication protocol is the GTP protocol as referred to earlier. It should however be clear that the processing arrangement 100 does not have to have three different kinds of processors, the functionality of the third processing means might as well be included in the functionality of the second processing means. Still further, there may of course also be further processing means having still other functionalities. The arrows at the top in the PDN are merely illustrated to indicate that the packet data flow in the direction from the mobile subscriber stations is much lower than the flow to the mobile subscriber stations as discussed earlier in the application.

The second processing means MP1 30, MP2 40, MP3 50 keep information about each mobile subscriber station for which packets are processed by the respective MP. To avoid the situation in which information for a specific mobile subscriber station is distributed to all second processing means, all packets for a particular mobile subscriber station are processed by one and the same second processing means, i.e., each mobile subscriber station registered with PDN 1 is assigned to a particular second processing means MP 30, 40 or 50. When a new mobile subscriber station logs onto the system, or is handed over from another packet data node, this is first detected in one of the first processing means SP1, BP2 via one of the base stations (BS). Thus, in the present application a new mobile subscriber station means a subscriber station that either is "new", or a subscriber station that has not been registered with the PDN before (or at least not recently), in other words a mobile subscriber station which at the moment is not assigned to a particular second processing means.

However, the first processing means, for example in this case BP2 20, then has to select a suitable second processing means to handle this new mobile subscriber station, in this particular case for example. MS 6. In order to avoid having some second processing means unduly loaded whereas others are only loaded to, e.g., a very limited extent, or less, or in other words that some have free capacity whereas others actually do not have sufficient processing capacity, the first processing means need to have knowledge about the current load situation on all the second processing means MP1 30, MP2 40, MP3 50. An alternative would be that each second processing means sends information about its current load status to all first processing means. This could be done periodically or upon the detection of a change in the load status or as a combination of both. However, it is essential to reduce the overhead load imposed by such an information distribution. When a message is sent from one processor to another, a certain amount of system resources is used such as communication media bandwidth, CPU (Central Processor Unit)-cycles, etc. As referred to earlier, one important aspect is that when the message containing information about the load status is small, the ratio of the resources used for the message and the resources used for the sum of the bytes in the messages is very high. This means that, from an information density point of view, it is expensive to send short messages, and a considerable load is produced. According to a particular embodiment of the present invention, separate load status information messages are sent as long as the system is not heavily loaded, i.e., the distribution of load status information is provided through the use of dedicated control messages. This is not, in general a problem since if the load on the system is low, there will also be available resources. However, to utilize the resources still more economically, the implementation described in the following paragraphs may also be applied when the load situation in the system is low.

If the system is heavily loaded, or alternatively, as referred to above, in any case, the load status information is "piggy-backed" on the payload messages sent from the second processing means or the managing processors MP1 30, MP2 40, MP3 50 to the first processing means BP1 10, BP2 20. I.e. each time a message comprising a number of packets (e.g. one packet) is sent from a second processing means to a first processing means, information about the local load status in the particular second processing means is added and sent together with the packet/message. In a particular embodiment, the same type of information distribution may be provided from third processing means DP1 60, DP2 70 to the second processing means MP1 30, MP2 40, MP3 50. This is however not necessarily the case but it constitutes an optional solution since, if a packet comes in from the external data network, e.g. IN, before a mobile subscriber station has sent anything, a second processing means, or a managing processor has not yet been selected, the packet may be disposed of and the problem of an uneven load distribution will be less pronounced and thus the gain will be lower.

As referred to above, the flow of packet data is expected to be much lower in the direction from the first processing means to the second processing means etc. than in the direction from the second processing to the first processing means. This means that during high load situations there is much more payload traffic to which the load status information can be "adhered".

As referred to above, each second processing means, or the managing processors, is assigned a number of mobile subscriber stations. This means that if a mobile subscriber station moves (within the coverage of the PDN), it may use another first processor means connection line but it will still use the same second processing means. Thus a virtual connection exists between the mobile subscriber station and the second processing means. The second processing means in the present embodiment provides for compression/decompression of information, encoding, cipering etc. and information data about the mobile subscriber station is included in the second processor means. For a particular mobile subscriber station it is not desirable to move packets between different second processing means but the assignment of second processing means should be changed with a frequency which is as low as possible in order to avoid a reduction in performance.

Thus, according to the invention, if a new mobile subscriber station registers with PDN 1, a first processing means BP2 20 (in this particular embodiment) is informed about the existence of MS 6 via the base station communicating with MS 6. A new mobile subscriber station either is a mobile subscriber station not having ever been registered with PDN 1, or a mobile subscriber station not having being connected to PDN 1 for some time as discussed above. BP2 20 uses the information on load status it has been provided with to find a second processing means to which MS 6 can be assigned. As referred to above, in a particular embodiment, for every packet that is sent from a second processing means to a first processing means, information about the load status in the sending second processing means is provided to the receiving first processing means. The higher the load, i.e., the more packets sent, the more information the first processing means obtains from the second processing means end the more up-to-date the information will be.

In an alternative embodiment, the second processing means comprises means for controlling the frequency at which load status information is provided to the first processing means. In an exemplary embodiment, a load status information provision frequency is given which is to be upheld irrespectively of whether any data packets are sent from the second to a first processing means or not. This means that if no data packets are sent, a separate message is created containing only load status information. Alternatively load status information may be provided with the given frequency only if data packets are sent. In an alternative embodiment, load status information is added to a data packet sent from a second processing means to a first processing means if the toad status in the second processing means undergoes a change or alternatively undergoes a change exceeding a given value. In a particular embodiment, load status information is provided from a second processing means to a first processing means either upon the axpiry of a timer provided in the second processing means or when a data packet is to be sent from the second processing means to the first processing means. As can be seen, a number of different criteria can be given for the provision of load status information from a second to a first processing means, but at least to some extent, the payload traffic is used for carrying load status information. This is very advantageous since, for example, if a conventional data packet is sent and the load status information is added to the ordinary data packet, the load status information may for example comprise about one percent of the content of the message thus giving a very efficient use of the resources in the system. Whereas, if a separate message is sent the amount of capacity required may be 10–50 times the really useful information contained in the message, namely the load status information, which means a considerable waste of resources.

Figure 4:
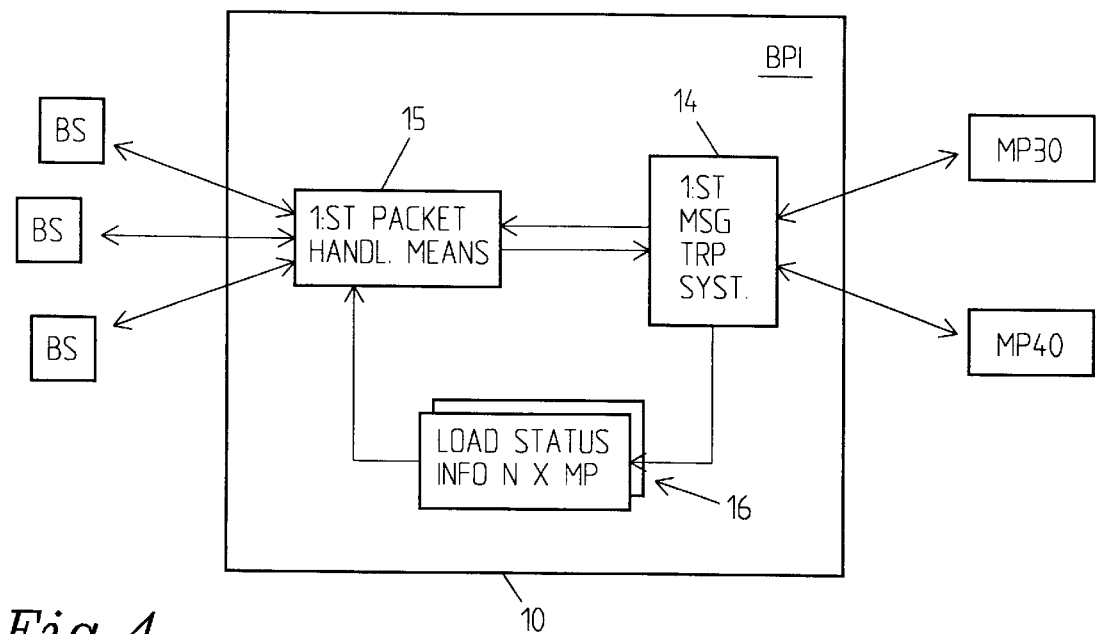

FIG. 4 shows one example on a first processing means 10. As referred to above the first processing means 10 communicates with a number of base stations, here merely denoted BS via a first communication protocol, e.g. BSSGP in the case of GSM. The first processing means 10 comprises a first message transportation system 14. All messages exchanged between a first processing means and a second processing means pass the message transportation system 14. The first processing means also contains load status information holding means 16 with a load status indicator for each second processing means N×MP supposing there are N MPS. Still further the first processing means 10 comprises a first packet handling means 15. Advantageously the load status indicators of the respective second processing means are as equal as possible to the original load status indicators on the second processing means using the minimum of resources or at the minimum resource costs. In FIG. 4 is schematically illustrated how the first processing means 10 communicates with a number of second processing means MP 30, MP 40 via the first message transportation system 14 over an interprocessor protocol.

Figure 5:
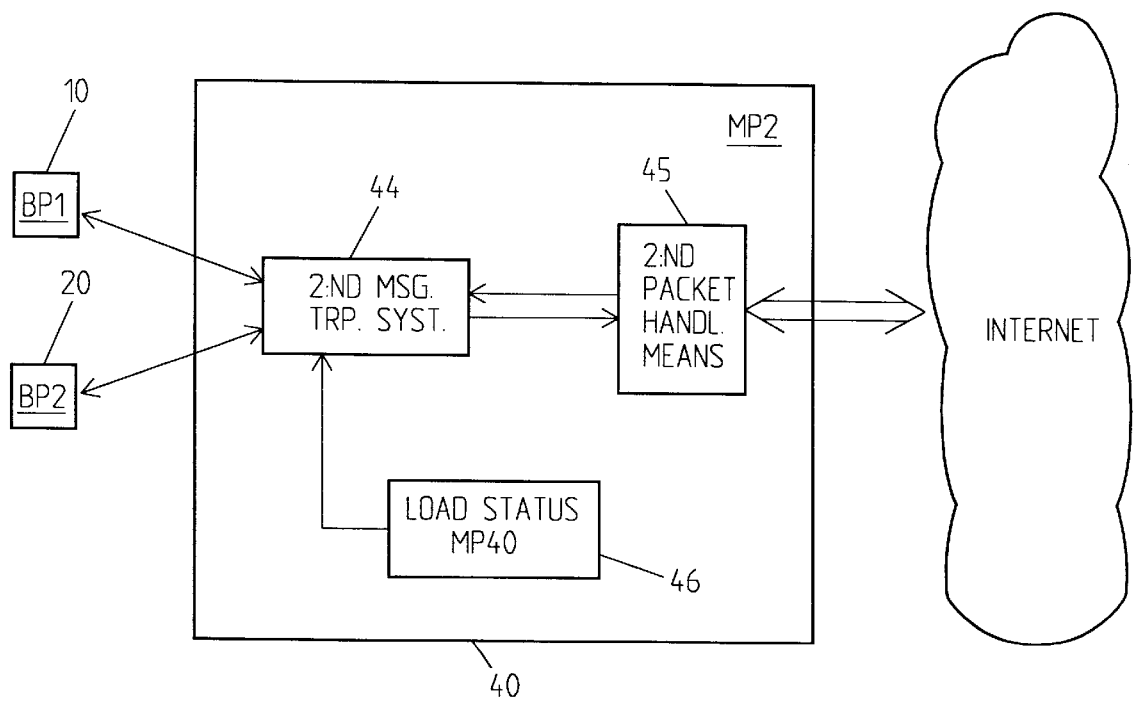

In a similar manner a second processing means 40 is illustrated in FIG. 5. It also contains a message transportation system, here called second message transportation system 44. All messages exchanged between a second processor and a first processor pass this component. The second processing means MP2 40 also contains a local load status indicator, load status MP40 46, the only property of which is to supply a value representing the current load status of MP2 40. The second processing means MP2 40 also comprises a second packet handling means 45 representing the main second processor functionality. The second packet handling means 45 receives packets coming from first processing means BP1 10, BP2 20 via the second message transportation system 44 and sends packets intended for first processors to the second message transportation system 44. In the figure is schematically illustrated how the second processing means 40 communicates with first processing means BP1 10, BP2 20 via the second message transportation system 44. Still further is schematically illustrated in the figure how the second processing means MP2 40 communicates with an external data network, e.g. Internet. The functionality of any third processing means is here not illustrated and it may be included in the second processing means or provided separately in third processing means (not shown). The gateway functionality as referred to above may either be contained within the packet data node or be provided for by a separate gateway node.

It should be noted that in the context of the present invention data exchanged between the packet handling means on a first and on second processor respectively are called packets and these packets are carried between the processors in messages. Messages are the data that is exchanged between the message transportation system in a second processing means and a first processing means.

Figure 6:
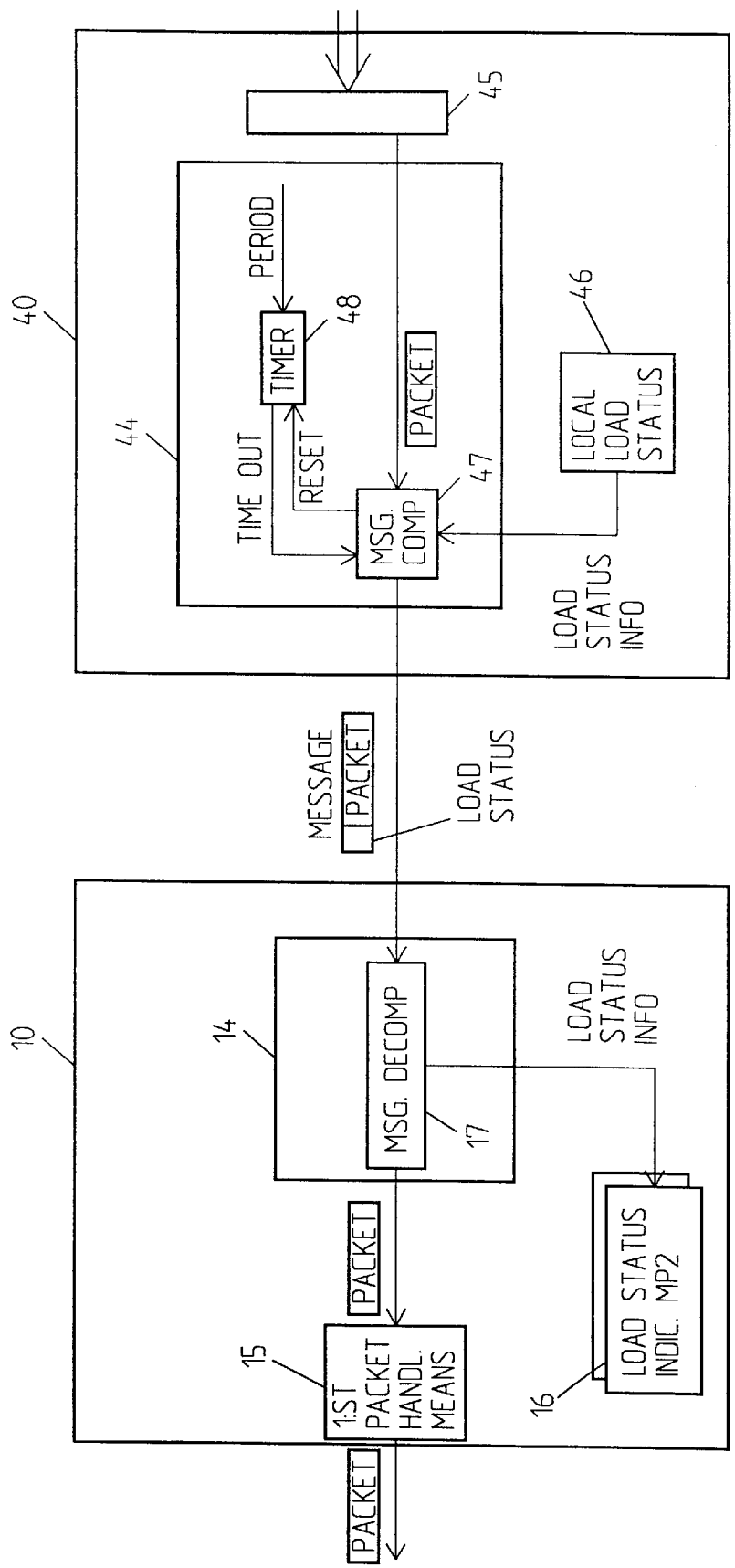

FIG. 6 schematically illustrates the internal structure of the message transportation system 14, 44 of the first processing means 10 and the second processing means 40. The sending parts on the side of the first processing means 10 and the receiving part on the side of the second processing means 40 are merely schematically illustrated through the first and the second packet handling means 15, 45 respectively. Still further only the relation between a single first processing means/second processing means 10, 40 is illustrated for reasons of simplicity. A message sent between the second processing means 40 and the first processing means 10 either contains load status information or a data packet or both. The second processing means 40 comprises, as referred to above, a second message transportation system 44. The second message transportation system 44 comprises a message composing means 47 which creates and sends a message on two occasions, namely when a packet is received from the second packet handling means 45 and upon reception of a time out from the timer 48. When a packet is received a message is created which is composed both of the packet and the current value as provided by the local load status indicator 46. The timer 48 is then resetted. When the message composing means 47 receives a time out from the timer 48, a message is created which only consists of the current load status value as provided by the local load status indicator 46. The timer produces a time out at the elapsed period time since the latest reset of the timer. The message composed of, or created by, the message composing means 47 is then sent as a message to the message transportation system 14 of the first processing means. The message is received in a message decomposing means 17 which is provided in the first message transportation system 14. The message decomposing means 17 makes an analysis of the content of the received message, and, if the message comprises both a packet and load status information, it decomposes the message into two subparts, here denoted load status information, which is provided to the load status information holding means 16 in which it is stored in the proper load status indicator corresponding to the second processing means 40, MP2, and a data packet which is provided to the first packet handling means 15. If the message only contains load status information, the load status information is similarly provided to the appropriate load status indicator in the load status information holding means 16. If the message only contains a packet, the data packet is transferred to the first packet handling means 15. If the message contained both load status information and a packet, the packet is similarly provided from the message decomposing means 17 to the first packet handling means 15 from where it is sent out to the appropriate base station.

In an alternative embodiment, as referred to above, the second message transportation system 44 and the second processing means 40 may not necessarily contain a timer 41 but load status information may be sent with every packet arriving to the message composing means 47. Still further, as also discussed in the foregoing, detecting means may be provided to detect a change in the local load status in which case it activates the sending of load status information from the local load status indicator 46 to the message composing means 47. A limit may also be given, upon the exceeding of which limit, the provision of load status of information to the message composing means 47 is activated. Such limit may be reconfigurable and controlled by a separate control means being provided to control a number of, or all, second processing means in the packet data node.

Figure 7:
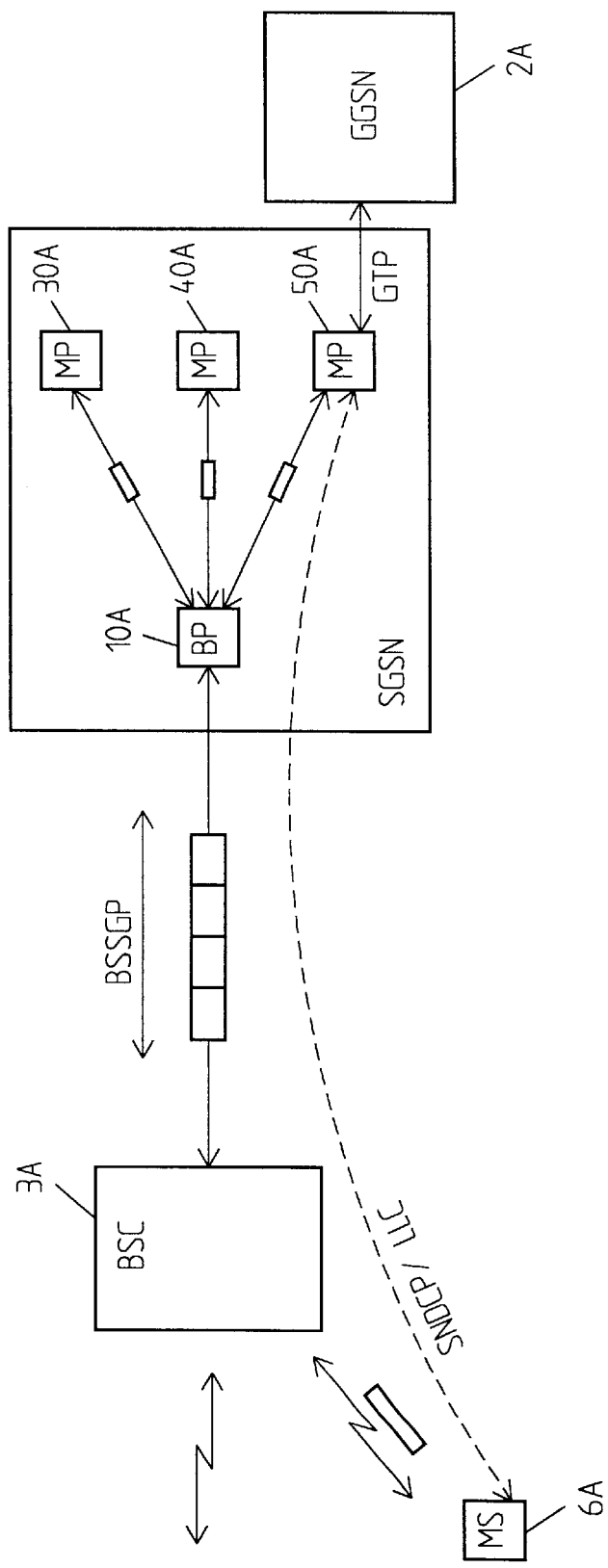

FIG. 7 again shows an implementation relating to GSM GPRS. SGSN 1 comprises here a number of processing means, namely first processing means BP 10A, second processing meawns MP 30A, 40A, 50A. Of course there are more first and second processing means, the figure is merely intended to illustrate the use of communication protocols. It is here supposed that a mobile station MS 6A arrives and needs to register with SGSN 1. For reasons of simplicity only BSC 3A is illustrated. In fact MS 6A communicates with a base station via radio link, which base station in turn is connected to BSC 3A. The BSC 3A provides information to BP 10A in SGSN 1 about MS 6A using the first communication protocol BSSGP. BP 10A keeps, as described above, information about the load status in MP 30A, 40A and 50A and knows that MP 50A is the MP that currently is the least loaded and therefore assigns MS 6A to MP 50A. MP 50A in turn communicates with GGSN 2A via the third communication protocol GTP (GPRS Tunnelling Protocol). Information about MS 6A is provided to MP 50A via SNDCP-LLC which thus terminates these protocols and a virtual connection is established for subsequent packets to/from MS 6A. Thus a physical mapping of the virtual connection is provided which is constant, which means that all packets go the same way through the system in order to enable to use the data that is available through the switch which is provided through SGSN 1.

Figure 8:
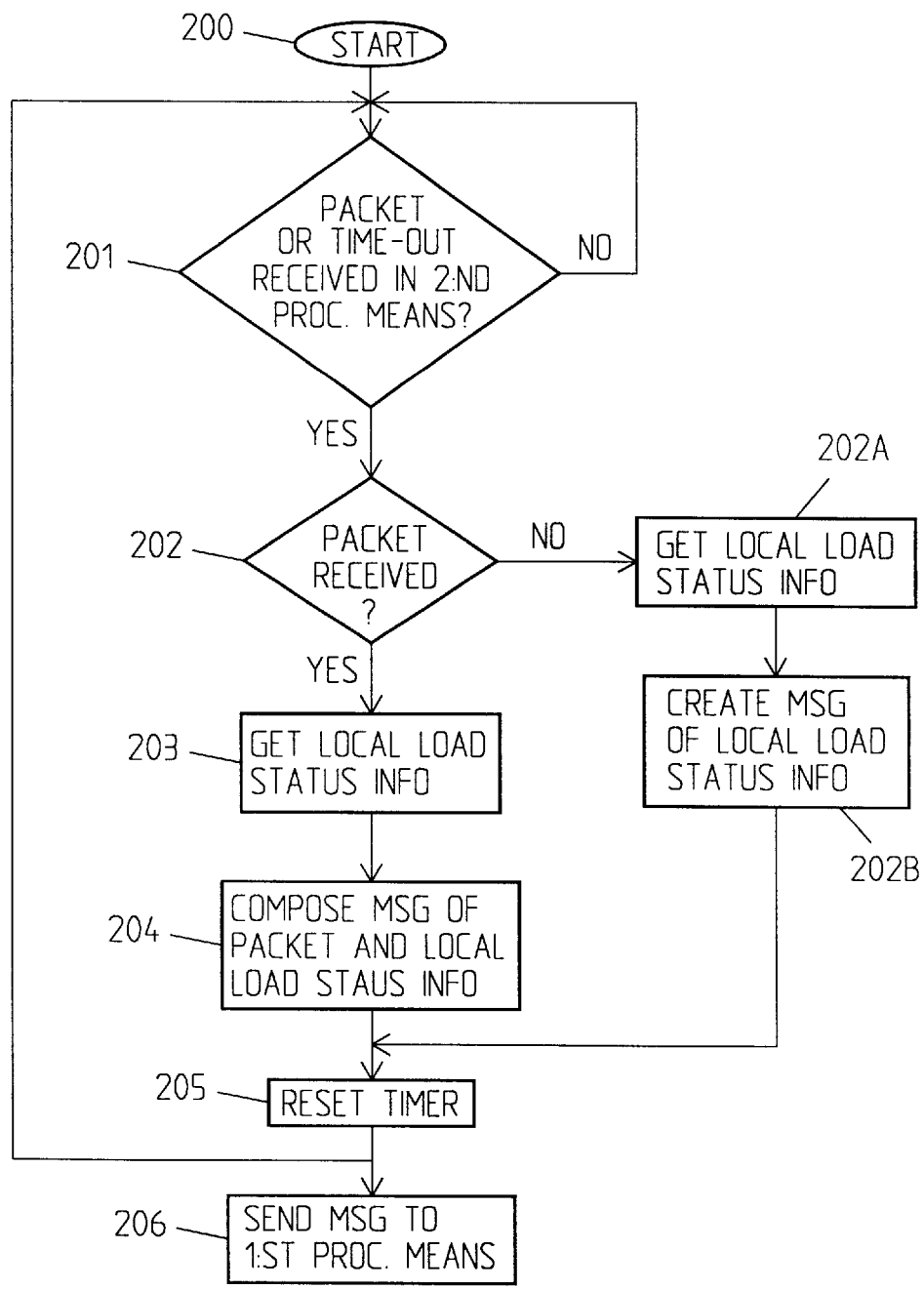
FIG. 8 is a flow diagram describing the procedure of sending load status information in a second processing means.

FIG. 8 is a flow diagram illustrating the procedure when local load status information is sent from a second processing means to a first processing means. In the illustrated embodiment it is supposed that the second processing means comprises a timer. It is supposed that the second processing means is in a start position, 200, in which the timer has been resetted etc. It is continuously detected whether a packet is received either from third processing means or from another node or if a time out signal is received, 201. If either of a packet or a time out is received, is examined whether a packet is received, 202. If no packet is received, a time out signal has been received and the local load status information of the second processing means is then fetched or provided, 202A. A message is then created which only contains the local load status information, 202B. Then the timer is resetted, 205, and the message consisting only of the local load status information is sent to the first processing means, 206, via the second packet handling means.

If however the examination whether a packet was received, 202, showed that a packet was actually received, the local load status information is fetched or automatically provided from the local load status indicator, 203. In message composing means a message is then composed of both the received packet and the local load status information, 204, and the timer is resetted, 205. The message consisting of the packet and the local load status information is then sent via the second packet handling means to the first processing means, 206.

In an alternative embodiment, if a packet is received, the load status information does not have to be sent, but for example a time out may also have to be received in order to control the rate at which load status information is provided. Still further, as referred to above, means may be provided to detect whether a change in the local load status has occurred and in local load status information is only provided when such change has occurred.

Figure 9:
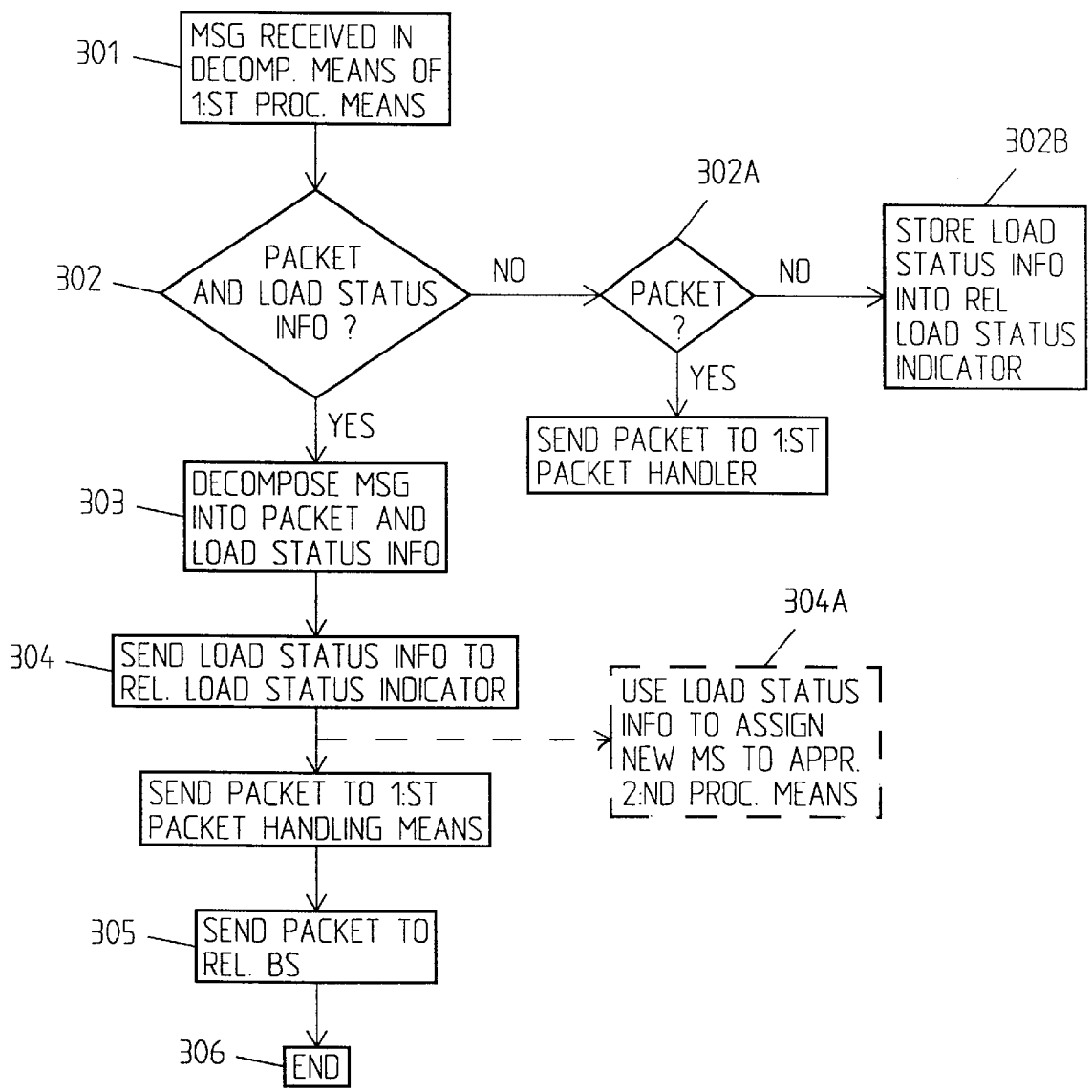
FIG. 9 is a flow diagram illustrating reception of a message in a first processing means.

FIG. 9 is a flow diagram corresponding to that of FIG. 8 but illustrating the procedure in the first processing means upon reception of a message from a second processing means.

It is thus supposed that a message MSG is received in decomposing means provided in the first processing means, 301. In the decomposing means then is examined whether the received message comprises both a packet and load status information, 302. If the message does not contain both a packet and load status information, it is examined whether it comprises a packet, 302A. If it does not contain a packet, the load status information is stored into the relevant load status indicator of the load status information holding means, 302B. If, however, it does contain a packet, the packet is sent on to the first packet handling means, 302C.

If finally it is detected that the message comprises both a packet and load status information, the message is decomposed into a separate packet and separate load status information, 303. The load status information is then sent to the relevant load status indicator of the load status information holding means, 304, whereas the packet is sent to the first packet handling means, 305. The load status information is then available and may be used to assign a new mobile subscriber station to the appropriate second processing means, 304A, i.e. as from that the load status information is available for processing of traffic up-links, the flow thus being in the opposite direction, therefore the connection to box 304A is illustrated through a dashed line. From the first packet handling means, the packet is sent to the relevant base station, 306, and the procedure is ended, 307, until a new message is received from any of the second processing means of the packet data node.

The invention is of course not limited to the explicitly illustrated embodiments, but it can be varied in a number of ways within the scope of the appended claims.

What is claimed is:

1. A processing arrangement in a cellular communication system for managing packet data communication for a plurality of mobile subscriber stations, said arrangement being connected to a plurality of base stations and communicating with said base stations over a first communication protocol, and communicating with a data network over a third communication protocol, the arrangement comprising:
a plurality of base station processors, each base station processor including:
means for communicating with a plurality of the base stations over the first communication protocol; and
means for assigning each registering mobile subscriber station to one of a plurality of managing processors based upon load status information received from each of the managing processors; and
a plurality of managing processors at a higher hierarchical level in the arrangement than the base station processors, said managing processors communicating with the base station processors over a second communication protocol, said managing processors registering and managing the mobile subscriber stations communicating with any of the base stations, each particular managing processor including:
means for storing mobile subscriber station information for a plurality of mobile subscriber stations; and
means for providing the plurality of base station processors with information about the load status of the particular managing processor;
wherein upon receiving a mobile subscriber station registration message in one of the base station processors, the base station processor utilizes the load status information from the plurality of managing processors to assign the registering mobile subscriber station to a managing processor that is more lightly loaded than others of the plurality of managing processors.

2. The arrangement according to claim 1, wherein the means for providing the plurality of base station processors with information about the load status of the particular managing processor includes means for placing the information about the load status in a payload message sent from the managing processor to the base station processors, upon determining that the load status of the managing processor exceeds a given value.

3. The arrangement according to claim 2, wherein the means for providing the plurality of base station processors with information about the load status of the particular managing processor includes means for providing the information in load status information control messages sent from the managing processor to the base station processors, upon determining that the load status of the managing processor is below the given value.

4. The arrangement according to claim 2, wherein the means for providing the plurality of base station processors with information about the load status of the particular managing processor includes means for including the information about the load status in each packet data payload message sent from the managing processor to any of the plurality of base station processors.

5. The arrangement according to claim 2, wherein the means for providing the plurality of base station processors with information about the load status of the particular managing processor includes means for sending payload messages with the load status information at a given frequency from the managing processor to the base station processors, and if there are no payload messages being sent at the time a load status information message is to be sent, sending control messages containing the Toad status information to the base station processors.

6. The arrangement according to claim 5, wherein at least one of the managing processors includes a timer, upon expiration of which a message is sent to the base station processors, said message including load status information about the current load in the managing processor.

7. The arrangement according to claim 1, wherein the managing processors include:
   means for receiving data packets from the data network over the third communication protocol;
   means for adding load status information for the managing processors to the data packets; and
   means for sending the data packets and load status information to the base station processors.

8. The arrangement according to claim 7, wherein the means for adding load status information to the data packets adds the load status information when a change in load status occurs in the managing processors.

9. The arrangement according to claim 7, wherein each base station processor includes means for holding load status information about all managing processors.

10. The arrangement according to claim 9, wherein the base station processors Include decomposing means for decomposing messages incoming from the managing processors, for sending load status information to the load status information holding means and for sending data packets to the plurality of base stations.

11. The arrangement according to claim 1, further comprising at least one connection processor in communication with each managing processor, said connection processor terminating the third communication protocol for connection to the external data network.

12. The arrangement according to claim 1, wherein the means for assigning each registering mobile subscriber station to one of the plurality of managing processors assigns new mobile subscriber stations considering a load status level of each of the managing processors so that none of the load status levels of the managing processors exceed a given level.

13. The arrangement according to claim 12, wherein each base station processor includes information on a desired load level for each managing processor, and each base station processor uses the load status information to assign new mobile subscriber stations to the managing processors to maintain the desired load level in each managing processor.

14. The arrangement according to claim 1, wherein the arrangement is implemented within a packet data node (PDN) within the cellular communication system.

15. Within a cellular communication system, a packet data node for supporting packet data communication, said packet data node communicating with a plurality of base stations using a first communication protocol and with an eternal data network over a third communication protocol, said packet data node comprising:
   a plurality of base station processors, each base station processor including:
      means for communicating with a plurality of the base stations over the first communication protocol;
      means for communicating with a plurality of managing processors over a second communication protocol; and
      means for assigning each registering mobile subscriber station to one of the plurality of managing processors based upon load status information received from each of the managing processors; and
   a plurality of managing processors in communication with at a higher hierarchical level in the packet data node than the base station processors, said managing processors communicating with the base station processors over the second communication protocol, said managing processors registering and managing the mobile subscriber stations communicating with any of the base stations, each particular managing processor including:
      means for storing mobile subscriber station information for a plurality of mobile subscriber stations; and
      means for providing the plurality of base station processors with information about the load status of the particular managing processor.

16. The system according to claim 15, wherein each managing processor includes:
   means for receiving data packets from the data network over the third communication protocol;
   means for adding load status information for the managing processor to the data packets; and
   means for sending the data packets and load status information to the plurality of base station processors.

17. A method of distributing a processing load among a plurality of managing processors in a packet data node in a cellular communication system supporting packet data communication with a plurality of mobile subscriber stations via a plurality of base stations, said node managing and controlling the sending of messages to and from the mobile subscriber stations, wherein the node includes a plurality of base station processors and a plurality of managing processors at a higher hierarchical level in the packet data node than the base station processors, the method comprising the steps of:
   storing load status information for the plurality of managing processors in each base station processor;
   receiving a mobile subscriber station registration message in a particular base station processor; and
   utilizing the load status information stored in the particular base station processor to assign the registering mobile subscriber station to a managing processor that is more lightly loaded than others of the plurality of managing processors;
   wherein the processing load is distributed among the managing processors.

18. The method according to claim 17, wherein the step of storing load status information for the plurality of managing processors in each base station processor includes the steps of:
   receiving by the managing processors, data packets destined for the mobile subscriber stations;
   adding by the managing processors, load status information for the managing processors to the data packets destined for the mobile subscriber stations; and
   sending the load status information with the data packets from the managing processors to the base station processors using an interprocessor communication protocol.

19. The method according to claim 18, wherein the step of adding the load status information by the managing processors includes adding the load status information each time the managing processor sends a data packet to a base station processor.

20. The method according to claim 18, further comprising the steps of:
   detecting in a managing processor whether the managing processors load status information has changed;
   sending the load status information to the base station processor if the load status information has changed; and
   otherwise, sending the data packets without status information until a change in load status occurs.

21. The method according to claim 18, further comprising the steps of:

determining a frequency at which the managing processors are to provide load status information to the base station processors;

setting a timer for initiating the sending of the load status information;

adding at the determined frequency, the load status information to each data packet sent from the managing processors; and sending at the determined frequency, the load status information as separate control messages if there are no data packets to be sent.

* * * * *

UNITED STATES PATENT AND TRADEMARK OFFICE
CERTIFICATE OF CORRECTION

PATENT NO. : 6,728,237 B2
APPLICATION NO. : 09/265863
DATED : April 27, 2004
INVENTOR(S) : Helander It is certified that error appears in the above-identified patent and that said Letters Patent is hereby corrected as shown below:

On Page 2, item (56), under "OTHER PUBLICATIONS", in Column 2, Line 1, delete "04, 65," and insert -- 04. 65, --, therefor.

In Column 6, Line 49, after "$3C_0, 3D_0$" insert -- . --.

In Column 8, Line 39, delete "SP1," and insert -- BP1, --, therefor.

In Column 10, Line 11, delete "end" and insert -- and --, therefor.

In Column 10, Line 25, delete "toad" and insert -- load --, therefor.

In Column 10, Line 29, delete "axpiry" and insert -- expiry --, therefor.

In Column 10, Line 42, delete "sent" and insert -- sent, --, therefor.

In Column 14, Line 64, in Claim 5, delete "Toad" and insert -- load --, therefor.

In Column 15, Line 20, in Claim 10, delete "Include" and insert -- include --, therefor.

In Column 15, Line 49, in Claim 15, delete "eternal" and insert -- external --, therefor.

In Column 15, Line 64, in Claim 15, after "processors" delete "in communication with".

UNITED STATES PATENT AND TRADEMARK OFFICE
CERTIFICATE OF CORRECTION

PATENT NO. : 6,728,237 B2
APPLICATION NO. : 09/265863
DATED : April 27, 2004
INVENTOR(S) : Helander It is certified that error appears in the above-identified patent and that said Letters Patent is hereby corrected as shown below:

In Column 16, Line 62, in Claim 20, delete "processors" and insert -- processor's --, therefor.

Signed and Sealed this

Twenty-second Day of July, 2008

JON W. DUDAS
*Director of the United States Patent and Trademark Office*